Feb. 6, 1934.  A. G. REED  1,945,868
MIXING APPARATUS
Original Filed May 20, 1929  2 Sheets-Sheet 1
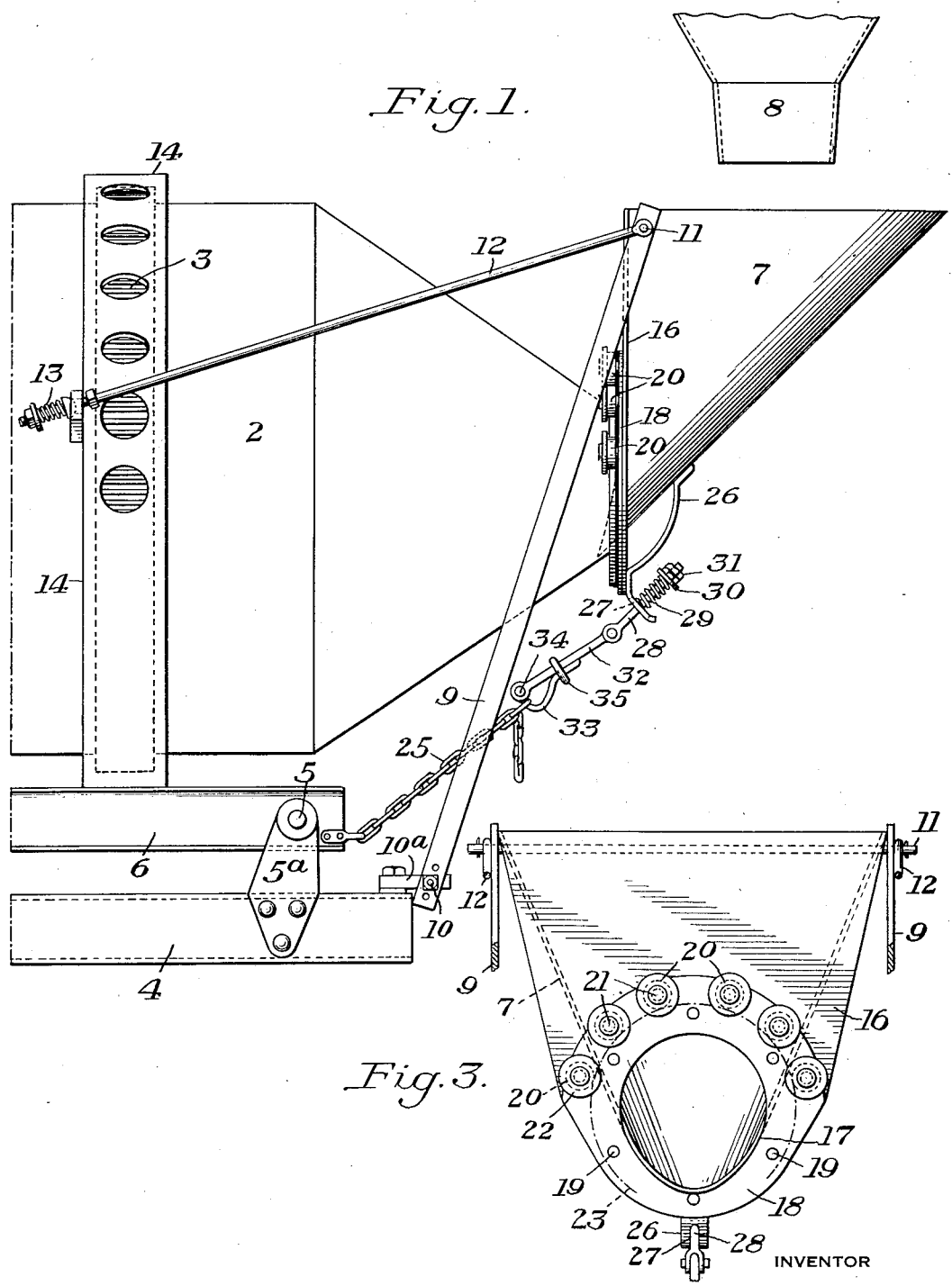

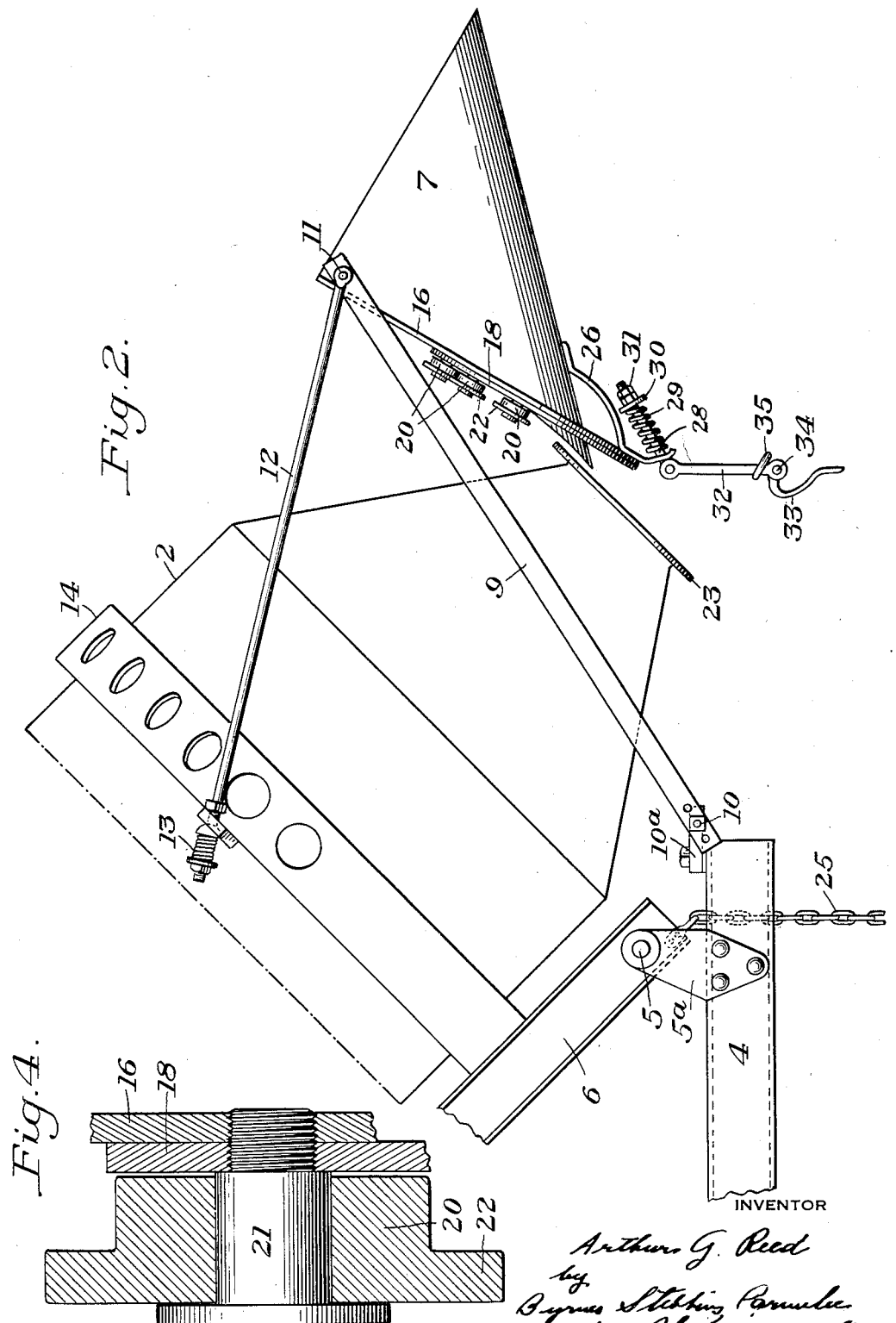

Patented Feb. 6, 1934

1,945,868

UNITED STATES PATENT OFFICE 1,945,868

MIXING APPARATUS

Arthur G. Reed, Swissvale, Pa., assignor, by mesne assignments, to Transit Mixers, Inc., San Francisco, Calif., a corporation of Nevada Original application May 20, 1929, Serial No. 364,344. Divided and this application February 6, 1932. Serial No. 591,340

9 Claims. (Cl. 83—73)

This invention relates generally to mixers of the type commonly used for mixing concrete, and more particularly to a charging boot and connections therefor, by means of which the boot may be connected to and disconnected from the mixer while the mixer is rotating, thereby enabling the mixer to be charged and discharged without stopping rotation of the mixer.

The present application is a division of my copending application, Serial No. 364,344, filed May 20, 1929, Patent No. 1,848,223, granted March 8, 1932.

Concrete mixers are now mounted on vehicles so as to allow the mixer to be operated while en route from the place where the mixer is charged to the place where the concrete is to be used. The batch is introduced into the mixer at one place, generally at the plant of the company supplying the concrete, while the mixer is rotating, and the mixing continues while the material is being transported to the place where it is to be used. The mixer ordinarily is rotated by power derived from the same source as the power which moves the vehicle. The mixer is rotated while the concrete is being discharged.

In accordance with my invention, I provide a charging boot for the mixer, the boot being connected to the mixer so as to allow relative rotation of the mixer with respect to the boot, and in this manner enabling the mixing operation to be carried on while the charge is being introduced into the mixer through the charging boot. In the preferred construction of the apparatus, the mixer and boot are connected by a roller and flange connection, the rollers preferably being carried by the charging boot and cooperating with a flange on the mixer, so as to form a connection between the parts while allowing rotation of the mixer.

In the accompanying drawings which illustrate the present preferred embodiment of my invention, Figure 1 is a partial side elevation of the mixer and charging boot in charging position, Figure 2 is a similar view of the apparatus while in discharging position, Figure 3 is an end elevation of the charging boot, and Figure 4 is a detail view of one of the rollers and associated parts for connecting the boot and mixer.

Referring more particularly to the accompanying drawings, there is shown an ordinary type of cylindrical mixing drum 2. The mixer is rotated through a gear 3 and other gearing (not shown) in accordance with common practice. The mixer is mounted on a supporting frame 4 of a vehicle (not shown), and when it is desired to discharge the contents of the mixer, it is tilted about its pivot point 5 by suitable tilting mechanism (not shown).

The mixer 2 is provided with a charging boot 7 which is supplied from a supply hopper 8 mounted thereabove. The boot 7 is pivotally supported by arms 9 which are pivotally connected at their lower ends to a rod 10 carried by brackets 10a mounted at each side of the frame 4. The upper ends of the arms 9 are pivotally connected to a rod 11 extending across the front of the boot. The boot is also supported, and its movement is controlled by links 12, each of which is pivotally connected at one end to the rod 11. The opposite end of each link 12 is resiliently connected by a spring 13 to the housing 14 of the gear 3. The spring 13 allows limited movement between the hopper and mixer while maintaining the connection between these parts.

The front face of the boot 7 has a plate 16 which is provided with a circular opening 17. A collar 18 is connected to the plate 16 by bolts 19. Rollers 20 are rotatably mounted on screws 21 which are screwed into the plate 16 and collar 18, as indicated in Figure 4. The rollers 20 are arranged semicircumferentially, as shown in Figure 3, each of the rollers having a flange 22 which fits over a flange 23 on the mixer to connect the boot and mixer when the parts are in charging position, as shown in Figure 1. This arrangement of flange and rollers provides a connection on the outside of the mixer which is not affected by the material charged into the mixer from the boot. It has been proposed previously to provide a charging boot with flanges which fit into corresponding flanges formed in the mixer. Such an arrangement has the disadvantage that the material in the mixer tends to get between the flanges on the charging boot and mixer, thereby preventing a tight joint between the parts. It also has the disadvantage that considerable power is required to overcome the friction between the sliding flanges of the boot and the mixer.

The roller and flange construction above described not only decreases friction but provides a connection on the outside of the mixer, so that there is no tendency for the material being mixed to collect, thereby preventing a tight connection.

As previously stated, mixers of the type herein referred to generally are mounted on a vehicle which transports the concrete from the plant of the seller to the place where the concrete is to be used. It is accordingly necessary to provide a charging boot which will prevent premature loss of contents of the mixer, as the mixer is being transported. The charging and discharge opening of the mixer is located at the rear of the motor vehicle, and if the vehicle makes a sudden stop, particularly, if it is going up hill, there is the danger of the concrete splashing out of the discharge opening in the mixer and also splashing over the opening in the mixing boot. Such a premature loss of contents of the mixer is guarded against in the present invention by making the charging boot sufficiently deep so that the charging opening at the top of the boot is located a considerable distance above the opening in the mixer, through which the mixer is charged and discharged, while the lower end of the boot is inside the opening. By reference to Figure 1, it will be seen that the side walls and end wall of the charging boot extend a substantial height above the charging and discharging opening in the mixer.

The boot and mixer are locked together through a chain 25 secured to a support 6 for the mixer, and a clamping member secured to the charging boot. The clamping member comprises a bracket 26 secured to the boot 7 and has its lower end bent and provided with an opening 27. A link 28 extends through the opening 27 and is resiliently held in place by a spring 29, washer 30 and nut 31.

The lower end of the link 28 is pivotally connected to a link 32 which has a clamp 33 pivoted thereto, as indicated by the reference numeral 34. The boot and mixer are locked together by inserting the clamp 33 in a link of the chain 25, rotating the clamp 33 to the position indicated in Figure 1, and securing it in such position by means of the ring 35.

When it is desired to dump the batch from the mixer 2, the mixer is tilted to discharge position, which position is indicated in Figure 2. The tilting of the mixer moves the arms 9 and links 12, as indicated, to disconnect the charging boot 7 from the mixer. The links 12 and arms 9, upon tilting of the mixer body displace the boot from the mixer so as to leave the opening in the mixer free for discharge of the batch. The rotatable rollers 20 allow the parts to be disconnected while the mixer is rotating. It is necessary, of course, to disconnect the chain from the clamp 23 before discharging the material from the mixer.

After the batch has been discharged, the mixer is again lowered, thus bringing the boot into the position indicated at Figure 1. The chain and clamp are again connected and the parts are again ready for charging a new batch of material into the mixer while the mixer is rotating.

It will be seen that the charging boot acts also as a gate to prevent accidental discharge of the mixer contents, and is in effect a gate hopper.

I have illustrated and described the present preferred form of my invention. It is to be understood, however, that the invention may be otherwise embodied within the scope of the following claims.

I claim:

1. Mixing apparatus comprising a rotatable mixer tiltably mounted on a frame, a charging boot pivotally supported from the mixer frame, a roller and flange connection between the boot and mixer on the outer surface of the mixer, and means connected to the boot and mixer adapted to disconnect the boot from the mixer as the mixer is tilted.

2. Mixing apparatus comprising a rotatable mixer tiltably mounted on a frame and having an opening through which it may be charged and discharged, a charging boot pivotally supported from the mixer frame, a roller and flange connection between the boot and mixer on the outer surface of the mixer, the charging boot having a charging opening at the top thereof through which the boot is charged, and a delivery opening at one end through which the charge is fed to the mixer, the charging opening of the boot being located a considerable distance above the opening in the mixer, whereby premature loss of material from the mixer is prevented.

3. Mixing apparatus comprising a rotatable mixer tiltably mounted on a frame, a charging boot pivotally supported from the mixer frame, a roller and flange connection between the boot and mixer on the outer surface of the mixer, a link pivotally connected adjacent one end to the boot and adjacent the other end to the mixer, said link being adapted to disconnect the boot from the mixer as the mixer is tilted.

4. Mixing apparatus comprising a rotatable mixer tiltably mounted on a frame, a charging boot, arms pivotally connected to the sides of the boot, said arms being pivotally connected at their other ends to the mixer frame, a roller and flange connection between the boot and mixer on the outer surface of the mixer, and a link pivotally mounted adjacent one end to the boot and adjacent the other end to the mixer, said link being adapted to disconnect the boot from the mixer as the mixer is tilted.

5. Mixing apparatus comprising a rotatable mixer tiltably mounted on a frame and having an opening through which it may be charged and discharged, the mixer having a circumferential flange adjacent the opening on the outer surface thereof, a charging boot carrying flanged rollers arranged circumferentially and adapted to fit over the flange on the mixer when in charging position, said charging boot being pivotally supported from the mixer frame, and means connecting the mixer and boot arranged to disconnect the boot from the mixer as the mixer is tilted to discharge position.

6. Mixing apparatus comprising a rotatable mixer tiltably mounted on a frame, a charging boot, arms pivotally connected to the sides of the boot, said arms being pivotally connected at their other ends to the mixer frame, flange rollers arranged circumferentially on the charging boot, the mixer having a circumferential flange adjacent the outlet opening thereof, links pivotally and resiliently connected to the mixer and pivotally connected to the charging boot, said links being disposed so as to disconnect the boot from the mixer as the mixer is tilted, and means for maintaining the boot rotatably connected to the mixer.

7. Mixing apparatus comprising a rotatable mixer tiltably mounted on a frame, a charging boot pivotally supported from the mixer frame, a roller and flange connection between the boot and mixer on the outer surface of the mixer, a chain and clamp resiliently connected holding means for holding the boot in charging position, and means pivotally connected to the boot and mixer adapted to disconnect the boot from the mixer when the mixer is tilted and the holding means is released.

8. Mixing apparatus comprising a rotatably and tiltably mounted mixer, a charging boot, supporting arms, each of which is pivotally connected at one end to the boot and at the other end to a support, a roller and flange connection between the mixer and boot on the outer surface of the mixer, and means connecting the mixer and boot whereby upon tilting of the mixer the boot is displaced bodily from the mixer.

9. Mixing apparatus comprising a rotatable mixer tiltably mounted on a frame and having an opening through which it may be charged and discharged, a charging boot pivotally supported from the mixer frame, a roller and flange connection between the boot and mixer on the outer surface of the mixer, the charging boot having a charging opening at the top thereof through which the boot is charged, and a delivery opening at one end through which the charge is fed to the mixer, the charging opening of the boot being located a considerable distance above the opening in the mixer and the lower end of the boot extending into the opening in the mixer, and means for bodily displacing the boot from the mixer as the latter is tilted for discharging materal therefrom.

ARTHUR G. REED.